Figure 1:
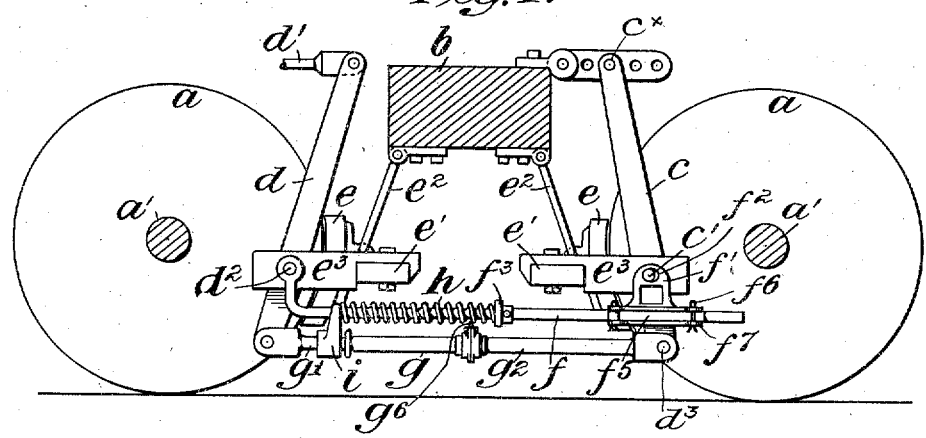

W. H. SAUVAGE.
BRAKE RIGGING.
APPLICATION FILED OCT. 4, 1909.

963,947.

Patented July 12, 1910.
3 SHEETS—SHEET 1.

Attest:

Inventor:
William H. Sauvage
by Redding, Greeley & Austin
Attys.

W. H. SAUVAGE.
BRAKE RIGGING.
APPLICATION FILED OCT. 4, 1909.
963,947.
Patented July 12, 1910.
3 SHEETS—SHEET 2.
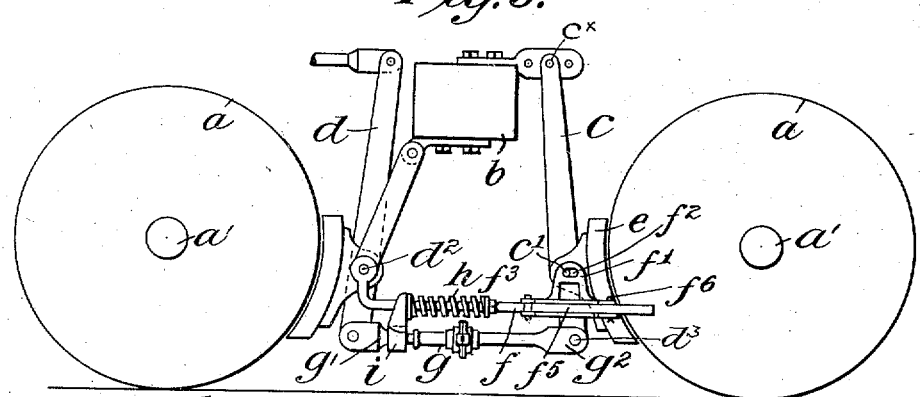

UNITED STATES PATENT OFFICE.

WILLIAM H. SAUVAGE, OF NEW YORK, N. Y.

BRAKE-RIGGING.

963,947.  Specification of Letters Patent.  Patented July 12, 1910.

Application filed October 4, 1909. Serial No. 520,861.

*To all whom it may concern:*

Be it known that I, WILLIAM H. SAUVAGE, a citizen of the United States, residing in the borough of Manhattan, of the city of New York, in the State of New York, have invented certain new and useful Improvements in Brake-Rigging, of which the following is a specification, reference being had to the accompanying drawings, forming a part hereof.

This invention relates to brake rigging in which the brake shoes are simultaneously applied to the leading and following wheels of a car truck through the medium of a live lever, at one end of which the brake mechanism is connected, and a dead lever, which is fulcrumed on the truck frame, the live and dead levers being connected by a bar through which the thrust is transmitted from the live lever to the dead lever. In brake rigging of this character, so far as the application of the present invention is concerned, the brake shoes may be actuated through brake beams to which the live and dead levers are connected or the brake beams may be dispensed with and the brake shoes actuated directly by the live and dead levers. The bar or bottom rod, as it is commonly called, which connects the live and dead levers, is usually extensible to compensate for or to take up excessive clearance or slack such as is occasioned by the wear of the brake shoes, and in connection with a brake rigging which embodies such an extensible bottom rod a release spring is necessarily employed to hold the brake shoes away from the wheels except when the brakes are applied. Such release spring has been applied heretofore in various positions, as on top of the live lever where it is not readily accessible, or, as is most commonly the case, between the truck frame and the brake beams. This latter application of the release spring or springs, however, is objectionable, particularly because of the considerable loss of braking power involved in overcoming the resistance of the springs. In no case, moreover, can a release spring, so applied, coöperate satisfactorily with slack adjusting devices such as are hereinafter described, which it is desirable to employ.

This invention, therefore, has for its object, primarily, to so combine the release spring with brake rigging of the character referred to as to avoid the objections mentioned and as to permit of the use of slack adjusting devices such as are described hereinafter.

The invention will be more fully explained hereinafter with reference to the accompanying drawings in which it is illustrated and in which—

Figure 2:
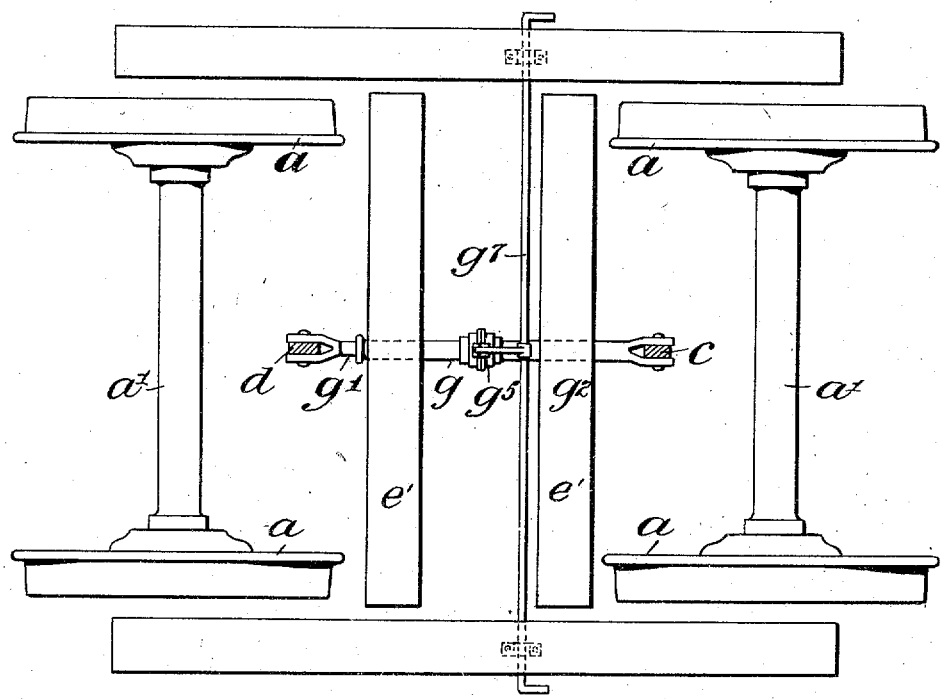
Figure 8:
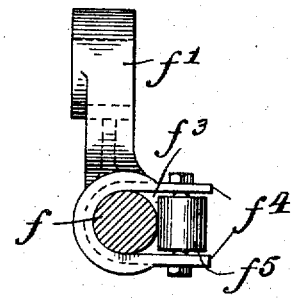
Figure 9:
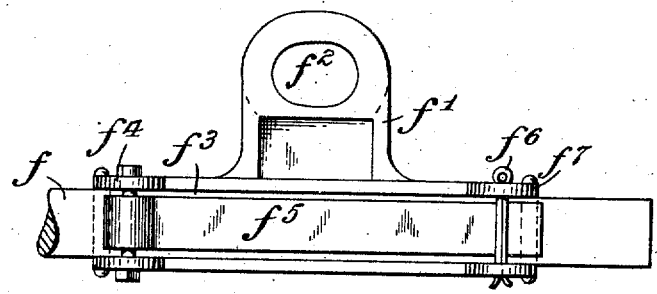
Figure 10:
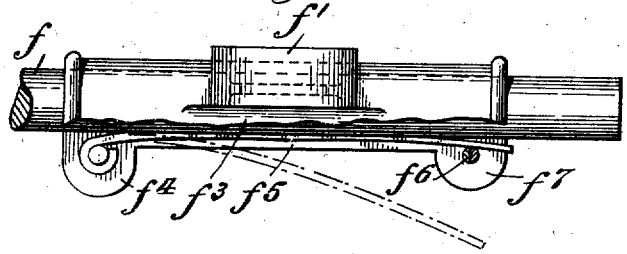

Figure 1 is a view, partly in elevation and partly in longitudinal section, of a railway car truck to which the invention is applied, the brake shoes being actuated, in this construction, through the medium of brake beams. Fig. 2 is a partial top view of the parts shown in Fig. 1. Fig. 3 is a view similar to Fig. 1, but illustrating the application of the invention to a beamless brake rigging. Fig. 4 is a detail view of the yoke interposed between the release spring and the extensible bottom rod. Figs. 5, 6 and 7 are detail views of the slack adjusting device employed in the construction shown in Figs. 1 and 3. Figs. 8, 9 and 10 are detail views of the friction coupling between the members of the adjusting bar.

In the construction shown in Fig. 1, the wheels $a$, axles $a'$ and bolster $b$ represent so much of an ordinary railway car truck as is necessary to enable the application of the invention to be understood. The dead lever $c$ is shown as suspended from the bolster $b$ through an adjustable fulcrum, indicated at $c^x$, and the corresponding live lever $d$ is shown as having connected to its upper end the brake rod $d'$, which may be actuated by hand operated devices or fluid pressure devices, or other operating devices of suitable character. The brakes $e$ which coöperate with the wheels $a$ are shown as carried by brake beams $e'$ which are suspended from the bolster $b$ by the usual links $e^2$ in such manner that when the brakes are released they tend to swing away from the wheels. The brake beams $e'$ are shown as connected to the live and dead levers respectively through the medium of arms $e^3$. The live and dead levers are connected through an adjusting bar $f$ which may be directly mounted, at one end, upon the fulcrum pin $d^2$ of the live lever $d$, and, at the other end, through the medium of an adjustable member $f'$, upon the fulcrum pin $c'$ of the dead lever $c$, such sliding or adjustable member $f'$ having an elongated slot $f^2$ in which the pin $c'$ may play, the slot having such length as is necessary to afford the predetermined and proper amount of clearance between the brake shoes and the wheel treads when the brakes are in full release position.

In the operation of the brake rigging, as the clearance between the brake shoes and the wheel treads increases, it is necessary that the opposite brakes shall be permitted to move farther apart, while at the same time only the necessary clearance between the brake shoes and the wheel treads is permitted. Accordingly, the adjusting bar comprises two members $f$ and $f'$ which are relatively movable longitudinally and are held frictionally from too free movement. A convenient and desirable construction for this purpose is shown in detail in Figs. 8, 9 and 10. As there represented, the member $f$ is received in a longitudinal channel $f^3$ formed in the member $f'$, and in a yoke $f^4$ at one end of such channel is hinged a flat, friction spring $f^5$, the normal set or bend of which is illustrated by dotted lines in Fig. 10. When the parts are assembled for operation the spring $f^5$ is pressed down upon the member $f$ and its free end is held, as by a pin $f^6$, in a yoke $f^7$ at the other end of the channel $f^3$, so that the spring bears against the member $f$.

In order that the braking force applied to the live lever $d$ may be transmitted to the dead lever $c$, and the brakes be thereby applied equally, whether they are between the wheels or outside of the wheels of the truck, the live and dead levers are connected by a coupling rod or bar $g$, such bar also serving as a fulcrum for the live lever. This coupling rod or bar, as usual in brake rigging of this character, is made extensible, comprising two relatively movable members $g'$ and $g^2$, connected respectively to the live lever $d$ and the dead lever $c$.

Any suitable means may be provided for holding the two members of the coupling bar in successively extended relation. The means which are preferably employed for the purpose are shown in detail in Figs. 5, 6 and 7. By reference to such figures, in connection with Figs. 1 and 2, it will be seen that the member $g^2$ is tubular, whether cylindrical or otherwise is immaterial, the member $g'$ telescoping therein. The member $g'$ is threaded, with a thread of steep pitch, as shown clearly in Fig. 7, and is engaged by a rotatable nut $g^3$ mounted for rotation in the tubular member $g^2$ and held from longitudinal movement therein. The nut $g^3$ is formed exteriorly with ratchet teeth $g^4$ which are engaged by a spring pressed pawl or dog $g^5$. The latter is provided with an eye $g^6$ which is extended outwardly through the casing of the chamber which receives the nut and is connected with rock-shaft $g^7$ which is extended to the sides of the truck in convenient position so that the pawl or dog may be disengaged from the ratchet teeth of the nut without requiring the brakeman to go under the car for the purpose. The pitch of the threaded portion of the member $g'$ is so steep that as the brakes are moved farther apart to compensate for wear on the brake shoes, the nut $g^3$ is rotated by the straight pull on the member $g'$, the ratchet teeth slipping under the spring pawl, whereby the two members are permitted to be relatively extended. The pawl or dog $g^5$, however, normally prevents rotation of the nut in the opposite direction and therefore retains the two members in their extended relation. Whenever it is desired to permit the brakes to move closer together, as for the substitution of new brake shoes, the pawl or dog $g^5$ is disengaged from the ratchet teeth by the rockshaft $g^7$ so that the nut may rotate when pressure is applied to the end of the member $g'$ and the member $g'$ is pushed into the member $g^2$ shortening the coupling rod to the desired extent.

The release spring $h$ is applied as a coil spring to the adjusting bar or rod $f$. At one end it bears against the collar $f^3$ on the rod as an abutment. The tension of the spring is exerted in the opposite direction upon the live lever through an abutment which is connected to the live lever at some distance from the pin $d^2$. In the construction shown the other end of the spring bears against a yoke $i$ which embraces loosely the rod $f$ and is swiveled upon the member $g'$ of the coupling bar $g$. The yoke may thus adapt itself to different relative positions of the rods $f$ and $g$ without danger of breakage. It will now be seen that when braking power is applied to the upper end of the live lever $d$, when the parts are arranged as shown in the drawings, the corresponding brake $e$ and fulcrum pin $d^2$ are moved to the left in Fig. 1 while the lower end of the brake lever and the fulcrum pin $d^3$ are moved to the right. The movement of the fulcrum pin $d^2$ to the left carries with it the bar $f$ and causes the collar $f^3$ thereon to bear against the right hand end of the spring $h$ tending to compress the same. The movement of the lower end of the live lever and the fulcrum pin $d^3$ to the right carries the movable rod $g$ to the right, causing the yoke $i$ to bear against the left hand end of the spring $h$ and tending to compress the same. The release spring $h$ is, therefore, compressed or placed under tension by the movement of the parts in the application of the brakes. If there is no false or lost motion between the brake shoes and the wheels, the release spring obviously will be compressed to a predetermined amount or put under a given tension at every operation of the brakes, and when the brake actuating mechanism is released the tension thus given to the release spring will react. Having for one abutment the relatively stationary collar $f^3$ on the rod $f$, the spring will have no effect upon the friction clutch, and having for its other abutment the yoke $i$ which is carried by the member $g'$ of the coupling bar $g$, connected to the lower end of the live lever $d$ at $d^3$, such lower end of the live lever $d$, being relatively movable, will be moved to the left by the reaction of the release spring. The live lever will thus be rocked on the pin $d^2$ as a fulcrum, its upper end being moved to the right into its full release position against the bolster $b$. The links $e^2$ by which the brake beams and brakes are suspended from the bolster being inclined as shown, the action of gravity on the brake beams and brake shoes will cause them to swing away from the wheels, the parts accommodating themselves to this movement. It will be understood, of course, that through the coupling rod $g$ the dead lever $c$ moves with the live lever $d$ and eventually the brake shoes connected with both live and dead levers come to rest at substantially equal distances from the corresponding wheels.

It has been assumed above that there is no false or lost motion between the brake shoe and the wheels, but as wear takes place between the brake shoes and the wheels, so that the brakes are more widely separately, the rod $f$ slips in the friction clutch member $f'$, carrying with it the relatively stationary abutment $f^3$ of the spring $h$, so that the action of the release spring is not interfered with, and at the same time the members $g'$ and $q^2$ of the coupling bar $g$ are relatively extended, the nut $g^3$ being allowed to rotate in the proper direction to permit such extension to take place, while the extended relation is automatically maintained by the engagement of the pawl or dog $g^5$ with the ratchet teeth on the nut $g^3$ to prevent the rotation of the nut in the opposite direction. The relation of the spring to the live lever $d$ is not changed and its reaction against the lower end of the live lever, through the yoke $i$ and rod $g'$, will therefore be the same in all successive operations. At the same time whenever it is necessary to replace new and thicker brake shoes for those which have been worn down thin, the coupling rod $g$ is permitted to be shortened by simply disengaging the pawl or dog $g^5$ from the ratchet teeth on the nut. It will be understood, of course, that under all conditions of operation the lost motion between the dead lever $c$ and the friction clutch member $f'$ permits the brake shoes to have the proper clearance from the wheel treads when the brakes are released.

In Fig 3 of the drawings the invention is shown as applied to a beamless brake rigging in which the beams $e'$ and links $e^2$ of the construction shown in Fig. 1 are dispensed with, and the brakes $e$ are hung directly upon the live and dead levers $d$ and $c$ through the fulcrum pins $d^2$ and $c'$ respectively. The adjusting rod $f$, $f'$, the coupling rod $g$, the release spring $h$ and the yoke $i$ coöperate with one another in the same manner as already described with reference to the construction shown in Fig. 1 and no further explanation is necessary.

It will be seen that in the improved construction not only does the release spring perform its function properly without opposing the braking power and therefore reducing its efficiency, but that there is no tendency in the construction to twist the brake rigging or to cause the brake shoes to drag against the wheel treads. Moreover, there is less liability to trouble by reason of lack of uniformity in springs which are applied as heretofore.

It will be understood that any suitable form of take-up or slack adjusting devices may be employed, although that shown and described herein is preferred on account of its simplicity, directness and certainty of operation and because it can be released to permit the substitution of new brake shoes without requiring the brakemen to crawl under the car. Various other changes in details of construction and arrangement may be made to suit different conditions of use.

I claim as my invention:

1. In a brake rigging, the combination of a live lever, a dead lever, an automatically extensible adjustable coupling bar connecting said levers and an adjusting bar connecting said levers, said adjusting bar comprising two relatively movable members having frictional engagement with each other.

2. In a brake rigging, the combination of a live lever, a dead lever, an adjustable coupling bar connecting said levers and an adjusting bar connecting said levers, said adjusting bar comprising two relatively movable members, one of said members being received in a longitudinal channel in the other member and said other member having a flat friction spring and means to hold the same upon the first named member.

3. In a brake rigging, the combination of a live lever, a dead lever, an automatically extensible adjustable coupling bar connecting said levers and an adjusting bar connecting said levers, said adjusting bar comprising two relatively movable members having frictional engagement with each other and one of said relatively movable members being connected with the corresponding lever with freedom for lost motion.

4. In a brake rigging, the combination of a live lever, a dead lever, an adjusting bar connecting said levers, a coupling bar connecting said levers, a release spring, an abutment on the adjusting bar for one end of said spring, and an abutment connected to the live lever for the other end of said spring.

5. In a brake rigging, the combination of a live lever, a dead lever, brakes connected with the levers respectively, an adjusting bar connecting said levers in the plane of the brake fulcra, a coupling bar connecting said levers, a release spring, an abutment on the adjusting bar for one end of said spring and an abutment connected to the live lever for the other end of said spring.

6. In a brake rigging, the combination of a live lever, a dead lever, an adjusting bar connecting said levers, a coupling bar connecting said levers, and a release spring acting between an abutment on the adjusting bar and an abutment on the coupling bar.

7. In a brake rigging, the combination of a live lever, a dead lever, brakes connected with the levers respectively, an adjusting bar connecting said levers in the plane of the brake fulcra, a coupling bar connecting said levers at their free ends, and a release spring acting between an abutment on the adjusting bar and an abutment on the coupling bar.

8. In a brake rigging, the combination of a live lever, a dead lever, brakes connected with said levers respectively, an adjusting bar connecting said levers in the plane of the brake fulcra, a coupling bar connecting said levers at their free ends, a coil release spring mounted on the adjusting bar and bearing against a relatively fixed abutment thereon, and a second abutment for said spring mounted on the coupling bar.

9. In a brake rigging, the combination of a live lever, a dead lever, brakes connected with said levers respectively, an adjusting bar connecting said levers in the plane of the brake fulcra, a coupling bar connecting said levers at their free ends, a coil release spring mounted on the adjusting bar and bearing against a relatively fixed abutment thereon, and a yoke mounted loosely on the coupling bar and forming an abutment for the other end of the release spring.

10. In a brake rigging, the combination of a live lever, a dead lever, brakes connected with said levers respectively, an adjusting bar connecting said levers in the plane of the brake fulcra and comprising two relatively movable members, a release spring having an abutment on one of said relatively movable members and a coupling bar connecting said levers at their free ends and carrying an abutment for the other end of said spring.

11. In a brake rigging, the combination of a live lever, a dead lever, brakes connected with said levers respectively, an adjusting bar connecting said levers in the plane of the brake fulcra, an adjustable coupling bar connecting said levers at their free ends and comprising two relatively movable members and a release spring having one abutment on the adjusting bar and the other abutment on one of the members of the coupling bar.

12. In a brake rigging, the combination of a live lever, a dead lever, brakes connected with said levers respectively, an adjusting bar connecting said levers in the plane of the brake fulcra and comprising two relatively movable members having frictional engagement with each other, an adjustable coupling bar connecting said levers at their free ends and comprising two relatively movable members and a release spring having one abutment on one of the members of the adjusting bar and the other abutment on one of the members of the coupling bar.

13. In a brake rigging, the combination with a truck, a live lever and a dead lever, of a coupling bar connecting said levers and comprising two telescoping members, devices to retain said telescoping members in successively extended relation and means extended to the side of the truck to release said devices.

14. In a brake rigging, the combination with a truck, a live lever and a dead lever, of a coupling bar connecting said levers and comprising two telescoping members, one of said members being screw threaded, a freely rotatable nut carried by the other of said members, devices to prevent rotation of the nut in one direction, and means extended to the side of the truck to release said devices.

15. In a brake rigging, the combination with a truck, a live lever and a dead lever, of a coupling bar connecting said levers and comprising two telescoping members, one of said members being screw threaded, a freely rotatable nut carried by the other of said members, a spring-pressed pawl or dog engaging said nut to prevent rotation thereof in one direction and means extended to the side of the truck to disengage said pawl or dog from said nut.

This specification signed and witnessed this first day of October A. D. 1909.

WILLIAM H. SAUVAGE.

Witnesses:
AMBROSE L. O'SHEA,
ELLA J. KRUGER.